(12) United States Patent
Joung et al.

(10) Patent No.: US 7,778,233 B2
(45) Date of Patent: Aug. 17, 2010

(54) TIME SYNCHRONIZING APPARATUS FOR MOBILE WIMAX ANALYZER

(75) Inventors: Jinsoup Joung, Seongnam (KR); Kyeongmin Ha, Seongnam (KR); Cheoljin Lee, Incheon (KR)

(73) Assignee: Innowireless Co., Ltd., Seongnam (KR)

( * ) Notice: Subject to any disclaimer, the term of this patent is extended or adjusted under 35 U.S.C. 154(b) by 616 days.

(21) Appl. No.: 11/739,883

(22) Filed: Apr. 25, 2007

(65) Prior Publication Data
US 2007/0247292 A1 Oct. 25, 2007

(30) Foreign Application Priority Data
Apr. 25, 2006 (KR) .................... 10-2006-0037034

(51) Int. Cl.
*H04J 3/06* (2006.01)
(52) U.S. Cl. ............... 370/350; 370/304; 370/324; 370/503
(58) Field of Classification Search ............ 370/349, 370/350, 324, 304, 345, 503, 507; 455/502; 375/353–376
See application file for complete search history.

(56) References Cited

U.S. PATENT DOCUMENTS 5,757,786 A * 5/1998 Joo ........................ 370/324
6,104,915 A * 8/2000 Zhang et al. .............. 455/76
2006/0244681 A1* 11/2006 Nakajima .................. 345/46

* cited by examiner

*Primary Examiner*—Kent Chang
*Assistant Examiner*—San Htun
(74) *Attorney, Agent, or Firm*—Rothwell, Figg, Ernst & Manbeck, P.C.

(57) ABSTRACT

Disclosed herein is a time synchronizing apparatus for a mobile WiMAX analyzer. The time synchronizing apparatus includes a Global Positioning System (GPS) receiver and a synchronization control unit. The GPS receiver outputs a GPS signal that is synchronized with the GPS time using information received from a GPS satellite. The synchronization control unit compares the GPS signal and a reference signal, which is generated using an internal clock, and controls synchronization according to the result of the comparison. The synchronization control unit includes an oscillator, a divider, an offset comparison unit and a processor. The oscillator outputs an oscillation signal having a predetermined frequency. The divider divides the oscillation signal into the reference signal. The offset comparison unit compares the differences between the GPS signal and the reference signal, and outputs the result value of the comparison. The processor controls the oscillation frequency of the oscillator until the result value satisfies a predetermined reference value.

6 Claims, 6 Drawing Sheets

[Fig. 1]
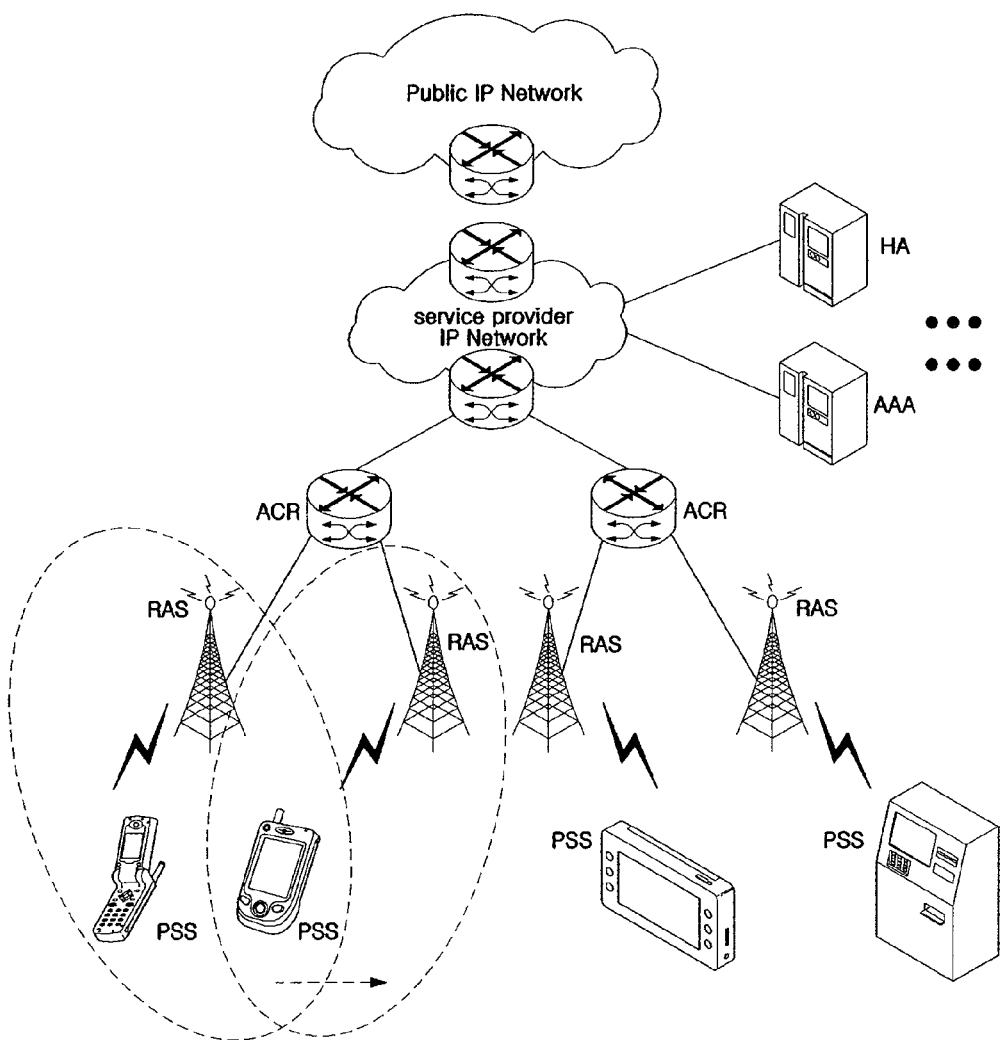

[Fig. 2]
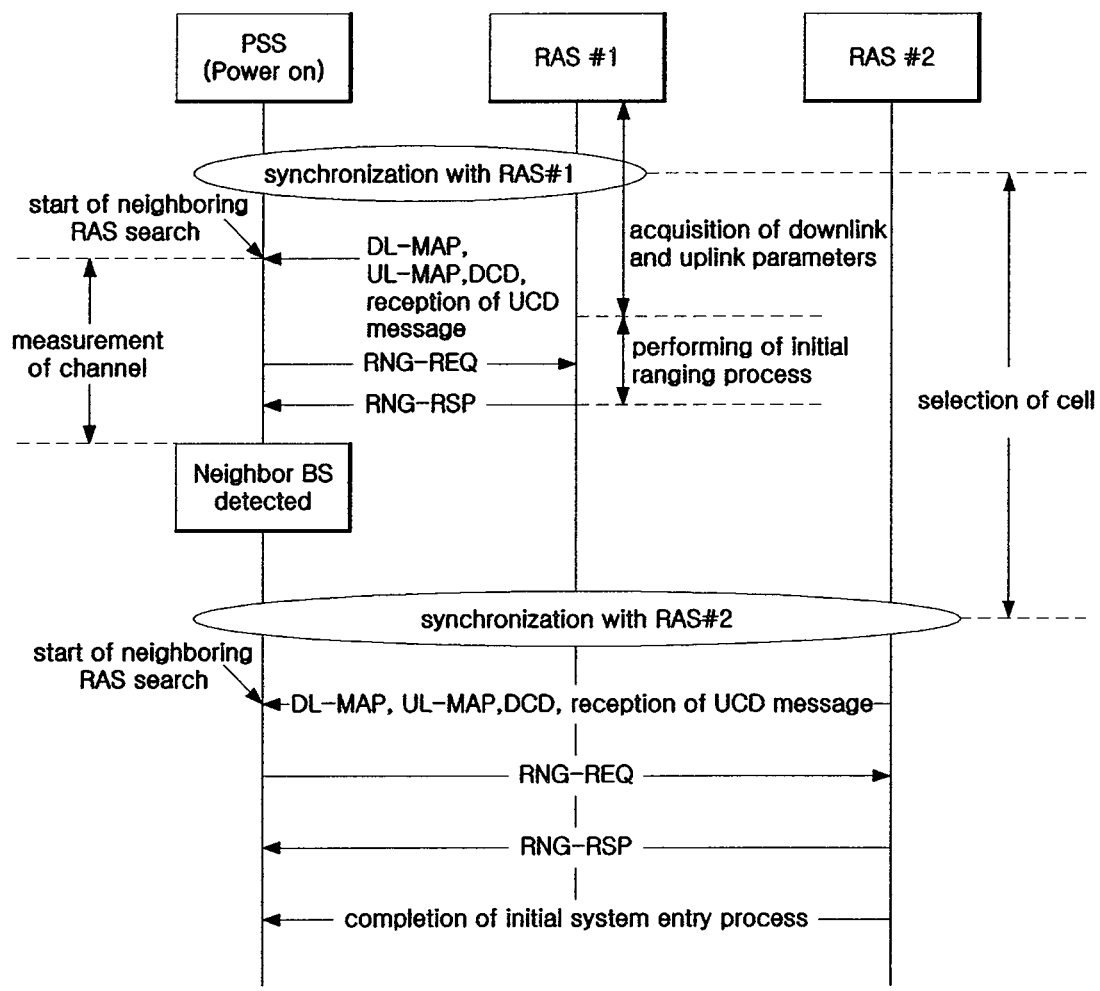

[Fig. 3]
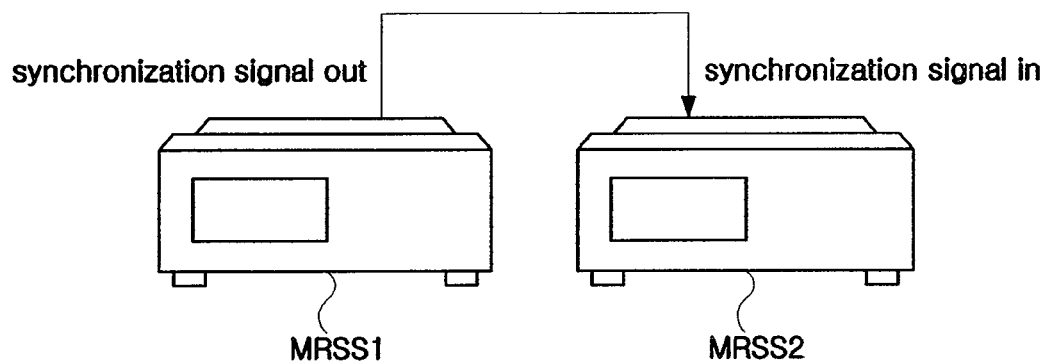
[Fig. 4]
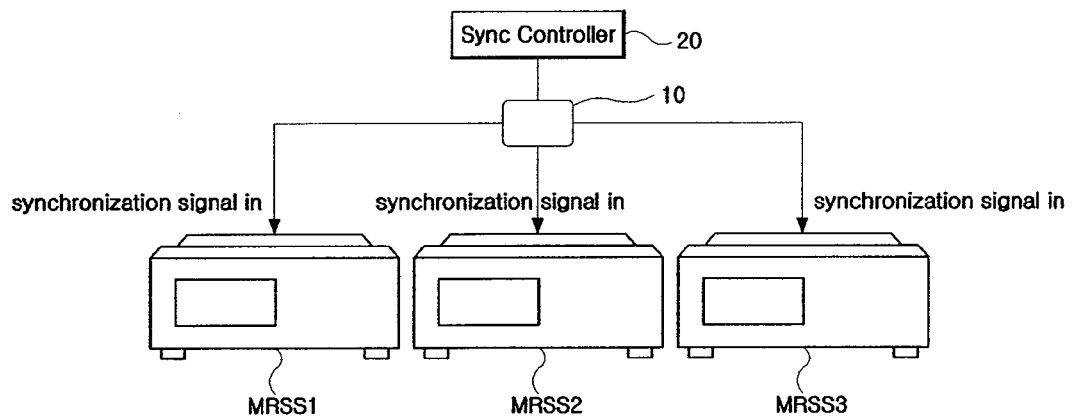

[Fig. 5]
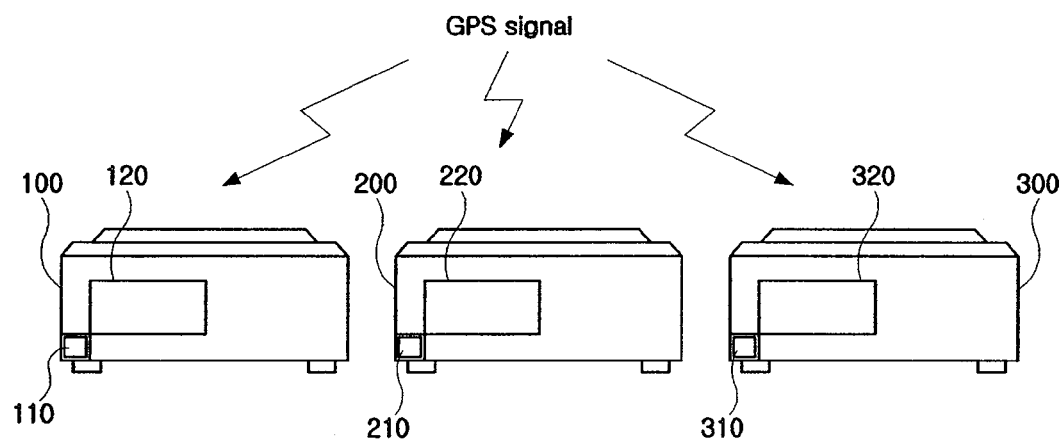

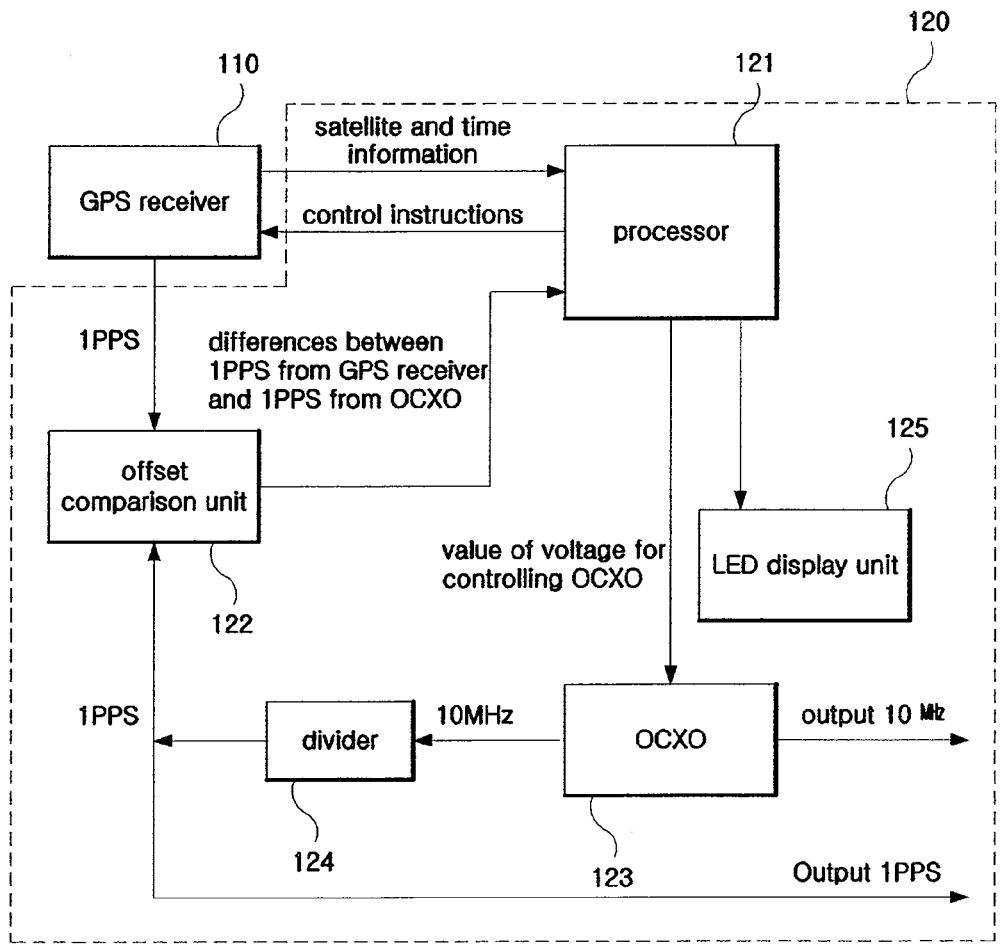
[Fig. 6]

[Fig. 7]
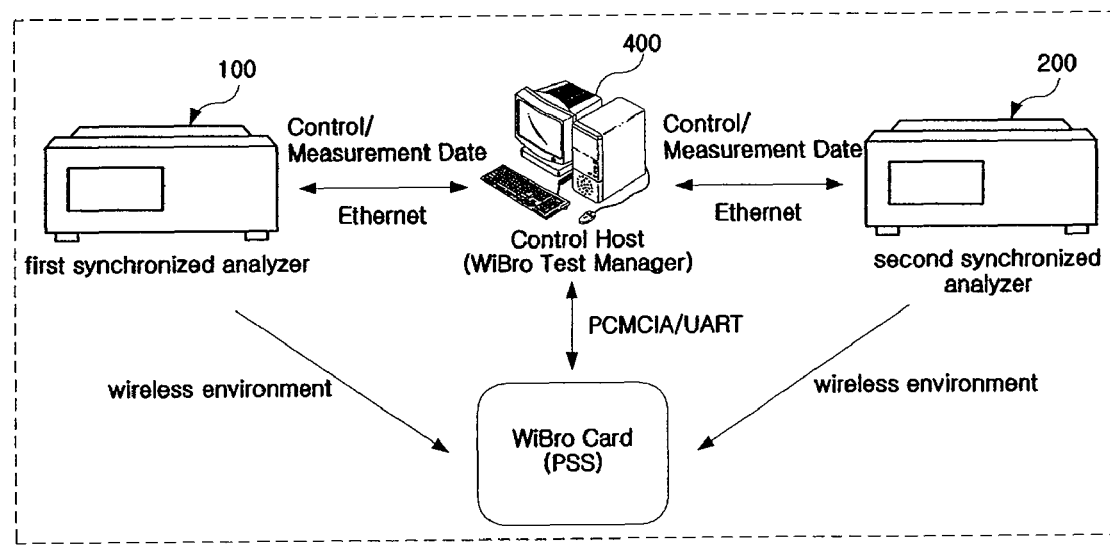

TIME SYNCHRONIZING APPARATUS FOR MOBILE WIMAX ANALYZER

CROSS REFERENCE TO RELATED APPLICATION

This application claims priority under 35 U.S.C. §119 based on Korean Patent Application No. 10-2006-0037034 filed Apr. 25, 2006, which is incorporated herein in its entirety.

BACKGROUND OF THE INVENTION

1. Field of the Invention

The present invention relates generally to a time synchronizing apparatus for a mobile WiMAX analyzer and, more particularly, to a time synchronizing apparatus for a mobile WiMAX analyzer, which is provided with some of the functions performed by individual radio access stations, so that time synchronization, which is essentially required between mobile WiMAX analyzers capable of carrying out handover tests for mobile WiMAX terminals, can be maintained.

2. Description of the Related Art

In a typical mobile communication system, the communication protocols between radio access stations may be classified into a synchronous type and an asynchronous type. Here, a synchronous scheme refers to a scheme for performing time synchronization between radio access stations using the common clock of a Global Positioning System (GPS), and an common clock of a Global Positioning System (GPS), and an asynchronous scheme refers to a scheme for not performing synchronization between the radio access stations. Unlike the synchronous scheme, the asynchronous scheme has an advantage in that flexibility for the installation of radio access stations is assured because it is not necessary to receive a GPS signal, but it has a disadvantage in that it takes a lot of time for a mobile communication terminal to detect a radio access station or achieve synchronization. For the synchronous scheme, existing IS-95-based cellular, PCS and Code Division Multiple Access (CDMA) 2000 communication methods are used. For the asynchronous scheme, a Wideband Code Division Multiple Access (W-CDMA) communication method, which was proposed in Japan and Europe, is used.

The mobile communication radio access stations, described above, are provided with respective atomic clocks, and synchronization between a calling party's mobile communication terminal and a called party's mobile communication terminal is performed using signals generated by the respective atomic clocks of the mobile communication terminals. In the case where a mobile communication terminal moves from a radio access station region to another radio access station region, the atomic clocks, which are provided in the respective radio access stations, must keep the same time so that high-quality crosstalk-free communication can be performed. For example, the atomic clocks must keep time to about one-millionth of a second, so that the mobile communication terminals operate normally. For this purpose, a signal that is generated by an atomic clock provided in the GPS is used.

Meanwhile, currently, schemes for wirelessly accessing the Internet are classified into a scheme for making access via a mobile telephone network based on a Wireless Application Protocol (WAP) or a Wireless Internet Platform for Interoperability (WIPI) platform, and a scheme of making access via a Public Wireless Local Area Network (LAN) and an access point. However, the former scheme has a fundamental limitation in that it cannot be widely used as an Internet access means due to the screen size, limitations of the input interface, a billing system based on usage-based charging, and the like. Furthermore, the latter scheme also has fundamental problems in that it can be used only within a radius of several tens of meters around the access point, and in that mobility is poor. In order to overcome these problems, a mobile WiBro or WiMax system has been proposed to provide a wireless Internet service that enables high-speed Internet access in a stationary state or in a low-speed moving state with Asymmetric Digital Subscriber Line (ADSL)-class quality and cost.

In such a mobile WiMAX system, Time Division Duplex (TDD) is employed as a duplex scheme, and Orthogonal Frequency Division Multiple Access (OFDMA) is employed as a multiple access scheme. In a TDD-based system, a signal transmitted to a mobile WiMAX terminal by a radio access station and a signal transmitted to the radio access station by the mobile WiMAX terminal shares the same frequency band but uses different time slots, so that, when the radio access station is not accurately synchronized in time, the performance of the system can be degraded due to collisions between the uplink and downlink signals of the radio access station and the mobile WiMAX terminal. Furthermore, the inaccuracy of a synchronization signal causes symbol timing offset and frequency offset in a signal received by the mobile WiMAX terminal. In particular, this becomes a main factor that degrades the performance of a system that uses an OFDM scheme.

Furthermore, in an environment including a plurality of cells, as in the mobile WiMAX system, each radio access station must support the handover of the mobile WiMAX terminal. Here, the term 'handover' refers to a process in which a mobile WiMAX terminal moves from a radio access station that provides a wireless interface to another radio access station. The handover is performed when it is necessary to change the radio access station to which the mobile WiMAX terminal is connected in order to provide a higher-quality signal, according to the degrees of signal attenuation and interference occurring when the mobile WiMAX terminal moves, or is performed when the mobile WiMAX terminal can receive higher Quality of Service (QoS) from another radio access station.

Accordingly, in the case of mobile WiMAX analyzers, each of which is provided with a function such as the above-described handover function, which is performed by each radio access station, and is capable of carrying out handover tests for mobile WiMAX terminals, it is essential that time synchronization be maintained between the analyzers. However, conventionally, an analyzer that is provided with the above-described function has not been proposed, and thus there is a problem in that reliable handover tests cannot be performed.

SUMMARY OF THE INVENTION

Accordingly, the present invention has been made keeping in mind the above problems occurring in the prior art, and an object of the present invention is to provide a time synchronizing apparatus for a mobile WiMAX analyzer, which is provided with some of the functions performed by individual radio access stations, so that time synchronization, which is essentially required between mobile WiMAX analyzers capable of carrying out handover tests for mobile WiMAX terminals, can be maintained.

In order to accomplish the above object, the present invention provides a time synchronizing apparatus for a mobile WiMAX analyzer, including a GPS receiver for outputting a GPS signal that is synchronized with the GPS time using information received from a GPS satellite; and a synchronization control unit for comparing the GPS signal, which is received from the GPS receiver, and a reference signal, which is generated using an internal clock, and controlling synchronization according to the result of the comparison; wherein the synchronization control unit includes an oscillator for outputting an oscillation signal having a predetermined frequency, which is used as an internal clock source; a divider for dividing the oscillation signal, which is output from the oscillator, into the reference signal, which has a frequency lower than that of the oscillation signal; an offset comparison unit for comparing the differences between the GPS signal, which is received from the GPS receiver, and the reference signal, which is generated by the divider, and outputting the result value of the comparison; and a processor for controlling the oscillation frequency of the oscillator until the result value output from the offset comparison unit satisfies a predetermined reference value.

Furthermore, it is preferred that the apparatus further include a Light Emitting Diode (LED) display unit for visually displaying the stabilized state of the synchronization, and the processor cause the LED to be turned on when the reference value is satisfied.

Furthermore, it is preferred that each of the GPS signal and the reference signal be a 1 PPS signal, and that, When the GPS signal or the reference signal is received, the offset comparison unit start counting based on the oscillation signal output from the oscillator, latch a count number reached until the GPS signal or the reference signal is received again, and then output the count number as the result value.

Furthermore, it is preferred that the offset comparison unit and the processor be implemented using Field Programmable Gate Arrays (FPGAs), and that the oscillator be implemented using an Oven-Controlled Crystal Oscillator (OCXO).

BRIEF DESCRIPTION OF THE DRAWINGS

The above and other objects, features and advantages of the present invention will be more clearly understood from the following detailed description taken in conjunction with the accompanying drawings, in which:

FIG. 1 is a diagram showing the construction of a network of a typical mobile WiMAX system;

FIG. 2 is a flowchart illustrating an initial access and handover process of a mobile WiMAX terminal;

FIG. 3 is a schematic diagram illustrating a synchronization scheme between mobile WiMAX analyzers according to an embodiment of the present invention;

FIG. 4 is a schematic diagram illustrating a synchronization scheme between mobile WiMAX analyzers according to another embodiment of the present invention;

FIG. 5 is a schematic diagram illustrating a synchronization scheme between mobile WiMAX analyzers according to a preferred embodiment of the present invention;

FIG. 6 is a block diagram showing the detailed construction of each synchronization control unit in FIG. 5; and FIG. 7 is a diagram schematically showing the construction of a handover test system using mobile WiMAX analyzers, each of which is provided with a time synchronizing apparatus of the present invention.

DESCRIPTION OF THE PREFERRED EMBODIMENTS

A preferred embodiment of a time synchronizing apparatus for a mobile WiMAX analyzer according to the present invention is described in detail with reference to the accompanying drawings below.

FIG. 1 is a diagram showing the construction of a network of a typical mobile WiMAX system. As shown in FIG. 1, the network of the mobile WiMAX system basically includes mobile WiMAX terminals (hereinafter simply referred to as 'portable subscriber stations PSS'), radio access stations RAS, and access control routers ACR. In the above-described construction, each of the portable subscriber stations PSS performs a mobile WiMAX radio access function, an Internet Protocol (IP)-based service access function, an IP mobility function, a terminal/user authentication and security function, a multicast service reception function, an interworking function with other networks, and the like. Furthermore, each of the radio access stations RAS performs a mobile WiMAX radio access function, a radio resource management and control function, a mobility (handoff) supporting function, an authentication and security function, a QoS providing function, a downlink multicast function, a billing function, a statistical information generating function, a notification function and the like. Furthermore, each of the access control routers ACR performs an IP routing and mobility management function, an authentication and security function, a QoS providing function, an IP multicast function, a billing service providing function of using a billing server, a mobility control function between the radio access stations in each access control router ACR, a resource management and control function, and the like.

In Table 1 below, principal parameters and essential requirements for the mobile WiMAX system are given. From Table 1, it can be seen that, in the mobile WiMAX system, TDD is employed as a duplex scheme and OFDMA is employed as a multiple access scheme.

TABLE 1

| Item | Scheme or Value |
| --- | --- |
| Duplex scheme | TDD |
| Multiple Access scheme | OFDMA |
| System Bandwidth | 10 ☐ |
| Transmission Rate per Subscriber | Downlink: 128 Kbps~1 Mbps<br>Uplink: 512 Kbps~3 Mbps |
| Frequency Reuse Coefficient | 1 |
| Frequency Efficiency | Maximum Frequency Efficiency:<br>Downlink/Uplink (6/2)<br>Average Frequency Efficiency:<br>Downlink/Uplink (2/1) |
| Handoff | Handoff Between Cells in Radio Access station, Handoff between Radio Access Stations, Handoff between frequencies: 150 ms |
| Mobility | Maximum 60 ☐/h |
| Service Coverage | Pico Cell: 100 m<br>Micro Cell: 400 m<br>Macro cell: 1 ☐ |

FIG. 2 is a flowchart illustrating an initial access and handover process of a mobile WiMAX terminal. As shown in FIG. 2, when the power of a portable subscriber station PSS is turned on, the portable subscriber station PSS achieves synchronization with a signal from a radio access station RAS#1. When the portable subscriber station PSS has achieved synchronization with the radio access station RAS#1, it receives a Downlink map (DL-MAP), indicating channel control parameters for a downlink, and Downlink Channel Descriptor (DCD) messages, and acquires access parameters for the downlink. Furthermore, the portable subscriber station PSS must wait until Uplink Channel Descriptor (UCD) messages are received from the radio access station in order to read the set of transmission parameters for an available uplink channel. Such UCD information is periodically transmitted from the radio access station. After all of the access parameters for the uplink and the downlink have been acquired, as described above, a ranging process is performed. Here, the term 'ranging' refers to an aggregation of processes for maintaining the quality of Radio Frequency (RF) communication connection between a radio access station RAS and a portable subscriber station PSS. The portable subscriber station PSS transmits an RNG-REQ message to the radio access station RAS#1 and receives an RNG-RSP message from radio access station RAS#1, and thus the process is performed.

Meanwhile, when handover is performed, an additional process, other than initial basic access, is required. First, the portable subscriber station PSS performs a network connection process or performs a process of searching for one or more radio access stations to find an appropriate radio access station for handover. After a target radio access station for performing handover has been found, a synchronization process, a connection parameter acquisition process and a ranging process for the new radio access station RAS#2 are performed in the same manner as described above in order to move to a new radio access station region. In this case, there exists a time period during which signals from two or more radio access stations RAS#1 and RAS#2 are simultaneously received and are demodulated. Accordingly, the above-described handover processes can be accurately performed only when time synchronization between the radio access stations RAS#1 and RAS#2, which transmit respective signals, is achieved. That is, the synchronization process and the parameter acquisition process, which have been performed to move to the target radio access station RAS#2, and a process of receiving data from the currently serving radio access station RAS#1 are simultaneously performed, so that the start time points of respective signals, which are generated from the two radio access stations RAS#1 and RAS2, must be the same, and the intervals between the respective signals must also be the same.

Accordingly, in mobile WiMAX analyzers, each of which is provided with a function, for example, a handover function, which is performed by each radio access station, and is capable of carrying out handover tests for the portable subscriber stations PSS, it is essentially required to perform time synchronization between two or more analyzers.

FIG. 3 is a schematic diagram illustrating a synchronization scheme between mobile WiMAX analyzers according to an embodiment of the present invention. As shown in FIG. 3, the synchronization scheme between mobile WiMAX analyzers according to an embodiment of the present invention is configured such that a clock signal used by an analyzer MRSS1 is directly provided to another analyzer MRSS2 and is used as a clock signal for the analyzer MRSS2, which is described in more detail below. Generally, each of the analyzers is provided with a terminal for outputting a reference clock signal, which is internally used, to the outside, and a terminal for receiving a clock signal from the outside. Using the terminals, the analyzer MRSS1 functions as a master analyzer for providing the clock signal, which is internally used, as the reference signal, and the analyzer MRSS2 adjacent to the master analyzer MRSS1 functions as a slave analyzer for receiving the clock signal provided from the master analyzer MRSS1. The above-described scheme is suitable for the case in which tests are performed using only two analyzers.

FIG. 4 is a schematic diagram illustrating a synchronization scheme between mobile WiMAX analyzers according to another embodiment of the present invention. As shown in FIG. 4, the synchronization scheme between mobile WiMAX analyzers according to another embodiment of the present invention is configured such that a clock signal, which is generated by a synchronization controller 20 installed outside a plurality of analyzers MRSS1, MRSS2 and MRSS3, is shared by the analyzers MRSS1, MRSS2 and MRSS3. In this scheme, a distributor 10 for distributing the clock signal, which is output from the synchronization controller 20, to the analyzers MRSS1, MRSS2 and MRSS3 is additionally required. The above-described scheme is suitable for the case in which a plurality of analyzers is used.

Meanwhile, although the analyzers, each of which uses time information provided from the GPS, can perform synchronization without separate input/output devices, that is, physical interconnections, the case where they cannot receive signals having a GPS frequency due to the clock error of a satellite, propagation delay through the ionosphere, a multiple channel environment, or signal noise occurs. Accordingly, a separate device for compensating for these problems is required.

FIG. 5 is a schematic diagram illustrating a synchronization scheme between mobile WiMAX analyzers according to a preferred embodiment of the present invention. As shown in FIG. 5, the time synchronizing apparatus of the prevent invention may be included in each of mobile WiMAX analyzers 100, 200 and 300, and may include GPS receivers 110, 210 and 310 for respectively outputting 1 Pulse Per Second (PPS) signals that are synchronized with the GPS time using information received from a GPS satellite, and synchronization control units 120, 220 and 320 for controlling synchronization based on a result obtained through the comparison of GPS signals, for example, 1 PPS signals, which are received from the GPS receivers 110, 210 and 310, and a reference signal having a predetermined frequency, which is generated using an internal clock.

FIG. 6 is a block diagram showing the detailed construction of each synchronization control unit in FIG. 5. In FIG. 6, reference numerals are assigned only to the mobile WiMAX analyzer 100 for ease of description. As shown in FIG. 6, the time synchronizing apparatus of the mobile WiMAX analyzer 100 according to a preferred embodiment of the present invention may include a GPS receiver 100 for outputting a 1 pps signal that is synchronized with the GPS time using information received from a GPS satellite, and a synchronization control unit 120. The synchronization control unit 120 may include an oscillator 123 for outputting an oscillation signal having a predetermined frequency, for example, 10 □, which is used as an internal clock source, a divider 124 for outputting a 1 PPS signal by dividing the oscillation signal of 10 □, which is output from the oscillator 123, into a signal having a predetermined frequency, for example, 1 □, an offset comparison unit 122 for comparing the differences between the 1 PPS signal, which is received from the GPS receiver 110, and the 1 PPS signal, which is generated by the divider 124, a LED display unit 125 for visually displaying the operational state of the apparatus, for example, the stabilized state of synchronization, and a processor 121 for controlling the overall operation of the system. In the above-described construction, it is preferred that the oscillator 123 be implemented using an Ovened-controlled Crystal Oscillator (OCXO) having a temperature compensation function, and it is preferred that the offset comparison unit 122 and the processor 121 be implemented using Field Programmable Gate Array (FPGAs).

Meanwhile, the operation of the time synchronizing apparatus of the present invention, having the above-described construction, is described in detail below. A basic clock, used to detect the differences between the 1 PPS signal, which is output from the GPS receiver, and the 1 PPS signal, which is output from the divider 124, is a system clock, that is, the oscillation signal output from the OCXO 123, which is an oscillator. The counting unit decreases in proportion to the increase in the frequency of the system clock, so that the differences can be accurately detected. In this case, when the 1 PPS signal, which is output from the GPS receiver 110, or the 1 PPS signal, which is a reference signal obtained by dividing the oscillation signal output from the OCXO 123, which is an oscillator, using the divider 124, are received, the apparatus starts counting, and latches the count number reached until the 1 PPS signal, which is the reference signal obtained by performing frequency division using the divider 124, or the 1 PPS, which is output from the GPS receiver 110, are received again so as to be read by the processor 121. Thereafter, the processor 121 converts a digital value, which is received from the offset comparison unit 122, into an analog voltage value and controls the frequency of the OCXO 123. In this case, the output frequency is controlled by the voltage value. As described above, the processor 121 controls the output of the OCXO 123 using information received from the GPS receiver 110 and the value read from the offset comparison unit 122. In this case, when a frequency accuracy above a predetermined reference is achieved, the processor 121 determines that a synchronization signal based on GPS control has been stabilized, and causes the LED display unit 125 to display information confirming that the synchronization signal. When the information confirming that the synchronization signal has been stabilized is displayed on the LED display unit 125 of the respective analyzers 100, 200 and 300, each of which is provided with the GPS receiver 110 therein, a determination that the analyzers 100, 200 and 300 are synchronized with the same basic clock is made, and then a test process can be performed.

FIG. 7 is a diagram schematically showing the construction of a handover test system using mobile WiMAX analyzers each of which is provided with the time synchronizing apparatus of the present invention. As shown in FIG. 7, the two analyzers 100 and 200 are synchronized using the time synchronizing apparatuses of the present invention. Further, under the assumption that channels were formed between the analyzers 100 and 200 and a portable subscriber station PSS in a wireless environment, a control host 400 functions to control the test process and determine whether the tests are passed. In the above-described construction, the control host 400 is connected with the analyzers 100 and 200 via the Ethernet, and is connected with the portable subscriber station (PSS) via PCMCIA/UART, thus monitoring the conditions of the portable subscriber station PSS. In order to avoid interference signals that may affect the tests, the test process may be performed within a shielded box.

As described above, the time synchronizing apparatus for a mobile WiMAX analyzer according to the present invention is provided with some of the functions performed by individual radio access stations, so that time synchronization between mobile WiMAX analyzers capable of carrying out handover tests for mobile WiMAX terminals can be accurately maintained, therefore various types of tests, including a handover test, can be accurately and definitely performed using the mobile WiMAX analyzers.

The time synchronizing apparatus for a mobile WiMAX analyzer according to the present invention is not limited to the above-described embodiments, and may be modified and implemented in various ways within a range that does not depart from the technical spirit of the present invention. For example, although, in the above-described embodiments, the 1 PPS signal is output from the GPS receiver 110, a signal having a different frequency may be output from the GPS receiver 110. Furthermore, a reference signal having a different frequency, instead of the 1PPS signal output from the divider 124, may be output from the divider 124.

What is claimed is:

1. A time synchronizing apparatus for a mobile WiMAX analyzer, comprising:
    a Global Positioning System (GPS) receiver for outputting a GPS signal that is synchronized with GPS time using information received from a GPS satellite; and
    a synchronization control unit for comparing the GPS signal, which is received from the GPS receiver, and a reference signal, which is generated using an internal clock, and controlling synchronization according to the result of the comparison;
    wherein the synchronization control unit comprises:
        an oscillator for outputting an oscillation signal having a predetermined frequency, which is used as an internal clock source;
        a divider for dividing the oscillation signal, which is output from the oscillator, to generate the reference signal, which has a frequency lower than that of the oscillation signal;
        an offset comparison unit for comparing differences between the GPS signal, which is received from the GPS receiver, and the reference signal, which is generated by the divider, and outputting a result value of the comparison; and
        a processor for controlling an oscillation frequency of the oscillator until the result value output from the offset comparison unit satisfies a predetermined reference value;
    wherein each of the GPS signal and the reference signal is a 1 PPS signal, and when the GPS signal or the reference signal is received, the offset comparison unit starts counting based on the oscillation signal output from the oscillator, latches a count number reached until the GPS signal or the reference signal is received again, and then outputs the count number as the result value.

2. The time synchronizing apparatus as set forth in claim 1, wherein the offset comparison unit and the processor are implemented using Field Programmable Gate Arrays (FPGAs).

3. The time synchronizing apparatus as set forth in claim 1, wherein the oscillator is implemented using an Oven-Controlled Crystal Oscillator (OCXO).

4. A time synchronizing apparatus for a mobile WiMAX analyzer, comprising:
    a Global Positioning System (GPS) receiver for outputting a GPS signal that is synchronized with GPS time using information received from a GPS satellite;
    a synchronization control unit for comparing the GPS signal, which is received from the GPS receiver, and a reference signal, which is generated using an internal clock, and controlling synchronization according to the result of the comparison; and
    a Light Emitting Diode (LED) display unit for visually displaying a stabilized state of the synchronization;
    wherein the synchronization control unit comprises:
        an oscillator for outputting an oscillation signal having a predetermined frequency, which is used as an internal clock source;
        a divider for dividing the oscillation signal, which is output from the oscillator, into the reference signal, which has a frequency lower than that of the oscillation signal;
        an offset comparison unit for comparing differences between the GPS signal, which is received from the GPS receiver, and the reference signal, which is generated by the divider, and outputting a result value of the comparison; and a processor for controlling an oscillation frequency of the oscillator until the result value output from the offset comparison unit satisfies a predetermined reference value;

wherein the processor causes the LED to be turned on when the reference value is satisfied; and wherein each of the GPS signal and the reference signal is a 1 PPS signal, and when the GPS signal or the reference signal is received, the offset comparison unit starts counting based on the oscillation signal output from the oscillator, latches a count number reached until the GPS signal or the reference signal is received again, and then outputs the count number as the result value.

5. The time synchronizing apparatus as set forth in claim 4, wherein the offset comparison unit and the processor are implemented using Field Programmable Gate Arrays (FPGAs).

6. The time synchronizing apparatus as set forth in claim 4, wherein the oscillator is implemented using an Oven-Controlled Crystal Oscillator (OCXO).

* * * * *